(12) United States Patent
Richardson et al.

(10) Patent No.: US 10,922,210 B2
(45) Date of Patent: Feb. 16, 2021

(54) AUTOMATIC SOFTWARE BEHAVIOR IDENTIFICATION USING EXECUTION RECORD

(71) Applicant: Microsoft Technology Licensing, LLC, Redmond, WA (US)

(72) Inventors: Leslie Yvette Richardson, Seattle, WA (US); Jackson Michael Davis, Carnation, WA (US); Del Myers, Seattle, WA (US); Thomas Lai, Redmond, WA (US); Andrew R. Sterland, Issaquah, WA (US); Jordi Mola, Bellevue, WA (US); James M. Pinkerton, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 16/284,913

(22) Filed: Feb. 25, 2019

(65) Prior Publication Data
US 2020/0272555 A1    Aug. 27, 2020

(51) Int. Cl.
*G06F 9/44*      (2018.01)
*G06F 11/36*    (2006.01)
(Continued)

(52) U.S. Cl.
CPC ........ *G06F 11/364* (2013.01); *G06F 11/3612* (2013.01); *G06F 11/0706* (2013.01);
(Continued)

(58) Field of Classification Search
CPC ............. G06F 11/0706; G06F 11/3476; G06F 11/3636; G06F 11/3612; G06F 11/36;
(Continued)

(56) References Cited

U.S. PATENT DOCUMENTS 5,675,803 A    10/1997   Preisler et al.
6,012,152 A     1/2000   Douik et al.
(Continued)

FOREIGN PATENT DOCUMENTS

EP    3425512 A1    1/2019
JP    5606261 B2    10/2014

OTHER PUBLICATIONS

Dorian C. Arnold et al., Stack Trace Analysis for Large Scale Debugging, 2007 IEEE, [Retrieved on Aug. 19, 2020]. Retrieved from the internet: <URL: https://ieeexplore.ieee.org/stamp/stamp.jsp?tp=&arnumber=4227982> 10 Pages (1-10) (Year: 2007).*

(Continued)

*Primary Examiner* — Anibal Rivera
(74) *Attorney, Agent, or Firm* — Workman Nydegger (57) ABSTRACT

The automatic identification of execution behavior(s) of software. This automatic identification is based on a historical analysis of execution records to identify a particular pattern that represents an execution behavior. In order to automatically identify an execution behavior present within particular software, an execution record (or perhaps multiple execution records) representing the execution of that particular software may be accessed. Based on finding the particular pattern within the execution record (or one, some, or all of the multiple execution records) representing the execution of that particular software, the computing system may automatically identify that the execution behavior is present within the software. This may dramatically assist in modifying that execution behavior.

20 Claims, 6 Drawing Sheets

(51) Int. Cl.
  *G06F 11/34* (2006.01)
  *G06F 11/07* (2006.01)
  *G06F 11/30* (2006.01)
  *G06F 11/32* (2006.01)

(52) U.S. Cl.
  CPC ...... *G06F 11/0778* (2013.01); *G06F 11/3006* (2013.01); *G06F 11/323* (2013.01); *G06F 11/3409* (2013.01); *G06F 11/3476* (2013.01); *G06F 11/3495* (2013.01); *G06F 11/3636* (2013.01); *G06F 11/3644* (2013.01)

(58) Field of Classification Search
  CPC ............. G06F 11/3409; G06F 11/3006; G06F 11/3495; G06F 11/3666; G06F 8/35; G06F 9/48; G06F 9/45516; G06F 11/364; G06F 11/366; G06F 11/28; G06F 11/3644; G06F 11/073; G06F 11/0709; G06F 11/32; G06F 11/34; G06F 11/302; G06F 11/0778; G06F 11/3604; G06F 11/323; G06F 11/3688; G06F 11/3466; G06F 9/4806; G06F 9/5011; G06F 8/656; G06F 8/65; G06F 8/78; G06F 8/71; G06F 8/10
  See application file for complete search history.

(56) References Cited

U.S. PATENT DOCUMENTS

| | | | | |
|---|---|---|---|---|
| 6,067,544 A * | 5/2000 | Moore | G06F 8/78 | |
| 6,253,336 B1 * | 6/2001 | Moore | G06F 8/78 | 707/999.006 |
| 6,279,127 B1 * | 8/2001 | Moore | G06F 8/78 | 707/999.101 |
| 7,249,286 B1 * | 7/2007 | Krishnan | H04L 41/0663 | 714/27 |
| 7,386,839 B1 * | 6/2008 | Golender | G06F 11/366 | 717/131 |
| 7,577,943 B2 * | 8/2009 | Chilimbi | G06F 11/3636 | 711/159 |
| 8,032,866 B1 * | 10/2011 | Golender | G06F 11/323 | 717/128 |
| 8,140,911 B2 * | 3/2012 | Borghetti | G06F 11/3409 | 714/25 |
| 8,522,082 B1 * | 8/2013 | Moore | G06F 11/366 | 714/38.1 |
| 8,850,172 B2 | 9/2014 | Dietrich et al. | | |
| 8,910,120 B2 | 12/2014 | Srinivasa et al. | | |
| 9,165,029 B2 * | 10/2015 | Bhoovaraghavan | G06F 3/04842 | |
| 9,207,969 B2 * | 12/2015 | Krajec | G06F 9/4806 | |
| 9,355,003 B2 * | 5/2016 | Bourne | G06F 11/3636 | |
| 9,811,434 B1 * | 11/2017 | Wagner | G06F 8/43 | |
| 9,934,127 B1 * | 4/2018 | Mola | G06F 11/364 | |
| 10,042,732 B2 * | 8/2018 | Wu | G06F 9/5083 | |
| 10,067,490 B2 | 9/2018 | Leonelli | G05B 19/0426 | |
| 10,073,763 B1 * | 9/2018 | Raman | G06F 11/3696 | |
| 10,346,292 B2 * | 7/2019 | Seto | G06F 8/70 | |
| 10,394,691 B1 * | 8/2019 | Cole | G06F 11/3612 | |
| 2004/0098642 A1 * | 5/2004 | Kaszycki | G06F 11/3636 | 714/45 |
| 2005/0091646 A1 * | 4/2005 | Chilimbi | G06F 8/30 | 717/130 |
| 2005/0160317 A1 * | 7/2005 | Biberstein | G06F 11/3688 | 714/25 |
| 2006/0005078 A1 * | 1/2006 | Guo | G06F 11/3636 | 714/38.11 |
| 2006/0248177 A1 * | 11/2006 | Dostert | G06F 11/3476 | 709/223 |
| 2008/0046673 A1 * | 2/2008 | Hwang | G06F 12/023 | 711/170 |
| 2008/0114806 A1 * | 5/2008 | Kosche | G06F 11/3495 | |
| 2008/0115041 A1 * | 5/2008 | Park | H03M 13/6331 | 714/785 |
| 2008/0127040 A1 * | 5/2008 | Barcellona | G06F 8/35 | 717/101 |
| 2008/0313602 A1 * | 12/2008 | Tillmann | G06F 11/3636 | 717/106 |
| 2009/0089761 A1 * | 4/2009 | Lazzaro | G06F 11/3664 | 717/128 |
| 2009/0193397 A1 * | 7/2009 | Chithambaram | G06F 8/35 | 717/128 |
| 2009/0235234 A1 * | 9/2009 | Biberstein | G06F 11/366 | 717/124 |
| 2009/0241096 A1 * | 9/2009 | Borghetti | G06F 11/3636 | 717/128 |
| 2009/0328006 A1 * | 12/2009 | Naruse | G06F 11/3636 | 717/128 |
| 2010/0082320 A1 * | 4/2010 | Wood | G06F 11/3428 | 703/22 |
| 2010/0083029 A1 * | 4/2010 | Erickson | G06F 11/0709 | 714/2 |
| 2012/0060142 A1 * | 3/2012 | Fliess | G06F 11/3428 | 717/102 |
| 2012/0124422 A1 * | 5/2012 | Hsiao | G06F 11/3466 | 714/26 |
| 2012/0143893 A1 * | 6/2012 | Abraham | G06F 16/2428 | 707/769 |
| 2012/0246622 A1 * | 9/2012 | Puthuff | G06F 11/3636 | 717/127 |
| 2014/0019598 A1 * | 1/2014 | Krajec | G06F 9/5083 | 709/220 |
| 2014/0019756 A1 * | 1/2014 | Krajec | G06F 21/52 | 713/167 |
| 2014/0019985 A1 * | 1/2014 | Krajec | G06F 9/4806 | 718/102 |
| 2014/0025572 A1 * | 1/2014 | Krajec | G06F 9/5055 | 705/40 |
| 2014/0108463 A1 * | 4/2014 | Gagliardi | G06F 11/3495 | 707/797 |
| 2014/0165204 A1 * | 6/2014 | Williams | H04L 63/02 | 726/25 |
| 2014/0181794 A1 * | 6/2014 | Grawrock | G06F 11/3636 | 717/128 |
| 2014/0237293 A1 * | 8/2014 | Cui | G06F 11/3414 | 714/37 |
| 2014/0337822 A1 * | 11/2014 | Puthuff | G06F 11/28 | 717/125 |
| 2015/0006961 A1 * | 1/2015 | Bourne | G06F 11/3072 | 714/37 |
| 2015/0081918 A1 * | 3/2015 | Nowack | H04L 65/1006 | 709/227 |
| 2015/0095709 A1 * | 4/2015 | Ramachandra | G06F 11/3604 | 714/38.1 |
| 2015/0234730 A1 * | 8/2015 | Puthuff | G06F 11/3636 | 717/128 |
| 2015/0278058 A1 * | 10/2015 | Kurts | G06F 11/3656 | 714/30 |
| 2015/0378799 A1 * | 12/2015 | Liu | G06F 11/3636 | 717/127 |
| 2016/0019042 A1 * | 1/2016 | Eberlein | G06F 8/656 | 717/168 |
| 2016/0140010 A1 * | 5/2016 | Herb | H02J 7/007 | 320/107 |
| 2016/0292065 A1 * | 10/2016 | Thangamani | H04L 41/064 | |
| 2016/0327925 A1 * | 11/2016 | Leonelli | G05B 19/0426 | |
| 2017/0132057 A1 * | 5/2017 | Zhang | G06F 11/0709 | |
| 2017/0177610 A1 * | 6/2017 | Knotts | G06F 16/1767 | |
| 2017/0212829 A1 * | 7/2017 | Bales | G06F 11/3612 | |
| 2017/0293546 A1 * | 10/2017 | Frontiero | G06F 11/302 | |
| 2017/0300401 A1 * | 10/2017 | K | G06F 11/3006 | |
| 2018/0011700 A1 * | 1/2018 | Plate | G06F 8/65 | |
| 2018/0052676 A1 * | 2/2018 | Charters | G06F 8/65 | |
| 2018/0060225 A1 * | 3/2018 | Tao | G06F 11/3612 | |
| 2018/0196657 A1 * | 7/2018 | Kou | G06F 8/65 | |
| 2018/0210808 A1 * | 7/2018 | Shanmugam | G06F 11/366 | |
| 2018/0365125 A1 * | 12/2018 | Mola | G06F 11/362 | |
| 2019/0012255 A1 * | 1/2019 | Mola | G06F 11/3636 | |

(56) References Cited

U.S. PATENT DOCUMENTS

| | | | |
|---|---|---|---|
| 2019/0147081 A1* | 5/2019 | Demla | G06F 16/26 |
| | | | 707/722 |
| 2019/0171633 A1* | 6/2019 | Demla | G06N 20/00 |
| 2019/0207969 A1* | 7/2019 | Brown | G06F 21/552 |
| 2019/0235942 A1* | 8/2019 | Flohr | G06F 11/0778 |
| 2019/0253328 A1* | 8/2019 | Kolar | G06F 11/302 |
| 2019/0266070 A1* | 8/2019 | Bhandarkar | G06F 11/3644 |
| 2019/0391904 A1* | 12/2019 | Sabharwal | G06F 11/3688 |

OTHER PUBLICATIONS

Rafael H. Bordini et al., Programming Multi-Agent Systems, Jul. 20, 2004, [Retrieved on Aug. 19, 2020]. Retrieved from the internet: <URL: https://link.springer.com/content/pdf/10.1007%2Fb105887.pdf> 261 Pages (1-248) (Year: 2004).*

Marshall, Don, "Time Travel Debugging—Overview", Retrieved from <<https://docs.microsoft.com/en-us/windows-hardware/drivers/debugger/time-travel-debugging-overview>>, Sep. 18, 2017, 7 Pages.

Taylor, Jason, "How to Take Logging to the Next Level With Improved .NET Logging Best Practices", Retrieved from <<https://stackify.com/csharp-logging-best-practices/>>, Jan. 16, 2014, 24 Pages.

"International Search Report and Written Opinion Issued in PCT Application No. PCT/US20/015501", dated May 29, 2020, 13 Pages. (MS# 405867-WO-PCT).

* cited by examiner

AUTOMATIC SOFTWARE BEHAVIOR IDENTIFICATION USING EXECUTION RECORD

BACKGROUND

Computing systems operate at the direction of computer-executable code. It is important to find logical errors within the code in order to ensure that the computing system operates properly. The finding of logical errors may be quite an intensive task, especially for complex pieces of code. Some logical errors can be found when the code is being drafted, when the code is being authored and debugged. Developers may author the code using source code, and then compile that source code into intermediate or binary code in order to test for logical errors that manifest within the developer's computing system environment. The code may then be shipped for execution in various production environments. It is sometimes possible to test the code by emulating certain aspects of the anticipated production environments.

Even so, logical errors may not make themselves manifest until the code runs in the production environment. Such logical errors may be due to characteristics or errors within the production environment itself. For instance, a database or other resource of the production environment might not have been configured correctly, environmental variables specific to that production environment might not have been set properly, credentials may not be set correctly, a resource might become dereferenced, there might be a leaking resource (such as leaking memory), there might be edges on conditions that result in a logical error, and so forth. There may be countless varieties of logical errors that might be encountered in countless numbers of production environments.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the automatic identification of execution behavior(s) of software. This automatic identification is based on a historical analysis of execution records to identify a particular pattern that represents an execution behavior. An example of the execution record might be an execution log that roughly captures execution by logging certain events that may occur during execution of software. On the other extreme, the execution record might be an execution trace that fastidiously and reproducibly represents the execution of the software within a particular execution environment, such that the execution trace may be used to rerun the execution precisely as it previously ran. The execution record might also be any record of execution with execution detail between these two extremes.

In order to automatically identify an execution behavior present within particular software, an execution record (or perhaps multiple execution records) representing the execution of that particular software may be accessed. Based on finding the particular pattern within the execution record (or one, some, or all of the multiple execution records) representing the execution of that particular software, the computing system may automatically identify that the execution behavior is present within the software. This may dramatically assist in modifying that execution behavior.

For instance, the execution record(s) might represent an execution of the software after the software is authored and deployed within its working environment (or within various working environments). The execution behavior identified may be due to particular characteristics of that environment, and how that environment is configured. For instance, if the execution behavior shows a malfunction of the software, the malfunction may be due to problems that relate to the working environment—rather than problems implicit in the software itself Such environment-related problems might be difficult to anticipate at the software authoring phase, as the variety of environment-related problems that could arise is countless and it is difficult to anticipate what problems are actually going to arise. For instance, perhaps the environment does not have a database that is configured correctly, perhaps credentials were set wrong, perhaps environmental variables were not set correctly, and so forth almost infinitum. However, by allowing a mechanism to detect the environmental problems that have been encountered during the real execution, the software provider can address the environmental execution problems that are tending to arise in the environment, allowing the software provider to ultimately provide software that more closely meets the characteristics of the ultimate execution environment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

At least some embodiments described herein relate to the automatic identification of execution behavior(s) of software. This automatic identification is based on a historical analysis of execution records to identify a particular pattern that represents an execution behavior. An example of the execution record might be an execution log that roughly captures execution by logging certain events that may occur during execution of software. On the other extreme, the execution record might be an execution trace that fastidiously and reproducibly represents the execution of the software within a particular execution environment, such that the execution trace may be used to rerun the execution precisely as it previously ran. The execution record might also be any record of execution with execution detail between these two extremes.

In order to automatically identify an execution behavior present within particular software, an execution record (or perhaps multiple execution records) representing the execution of that particular software may be accessed. Based on finding the particular pattern within the execution record (or one, some, or all of the multiple execution records) representing the execution of that particular software, the computing system may automatically identify that the execution behavior is present within the software. This may dramatically assist in modifying that execution behavior.

For instance, the execution record(s) might represent an execution of the software after the software is authored and deployed within its working environment (or within various working environments). The execution behavior identified may be due to particular characteristics of that environment, and how that environment is configured. For instance, if the execution behavior shows a malfunction of the software, the malfunction may be due to problems that relate to the working environment—rather than problems implicit in the software itself Such environment-related problems might be difficult to anticipate at the software authoring phase, as the variety of environment-related problems that could arise is countless and it is difficult to anticipate what problems are actually going to arise. For instance, perhaps the environment does not have a database that is configured correctly, perhaps credentials were set wrong, perhaps environmental variables were not set correctly, and so forth almost infinitum. However, by allowing a mechanism to detect the environmental problems that have been encountered during the real execution, the software provider can address the environmental execution problems that are tending to arise in the environment, allowing the software provider to ultimately provide software that more closely meets the characteristics of the ultimate execution environment.

Figure 1:
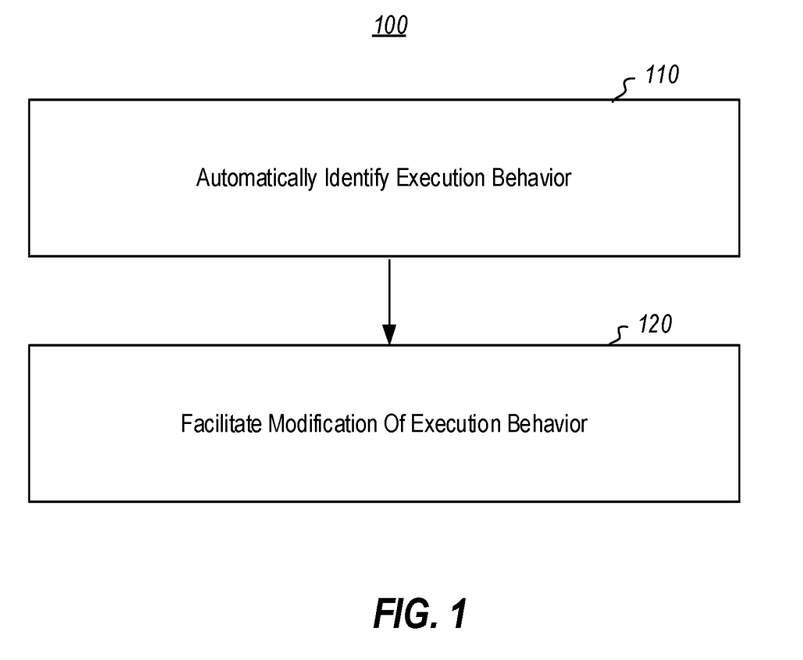
FIG. 1 illustrates a flowchart of a method for automatically identifying an execution behavior of software so that the execution behavior can be modified.

FIG. 1 illustrates a flowchart of a method 100 for automatically identifying an execution behavior of software so that the execution behavior can be modified. The method 100 may be performed by a computing system in response to executing computer-executable instructions that are structured to cause the computing system to perform the method 100. For instance, one or more processors of the computing system may execute those instructions and cause the method 100 to be performed. An example of such a computing system is described below with respect to the computing system 600 of FIG. 6.

The method 100 includes two steps 110 and 120. First, the computing system automatically identifies an execution behavior of software (step 110). Next, the computing system optionally uses the identified execution behavior to facilitate modification of the execution behavior (step 120). The facilitation of the modification of the execution behavior may be in conjunction with interfacing with a user. Each of these steps may include corresponding acts that support the steps.

Figure 2:
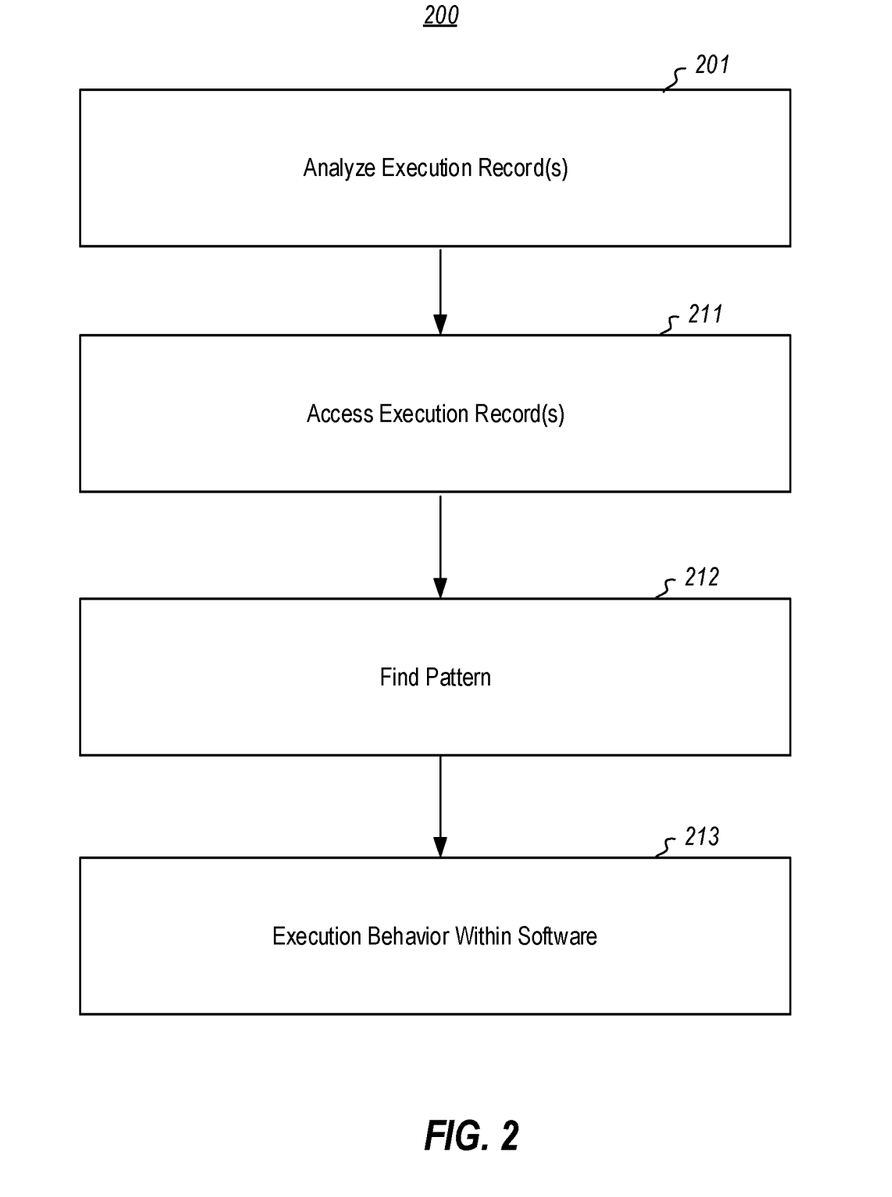
FIG. 2 illustrates a flowchart of a method for automatically identifying an execution behavior of software, and is one example of the corresponding acts that support the first step in FIG. 1.
Figure 3:
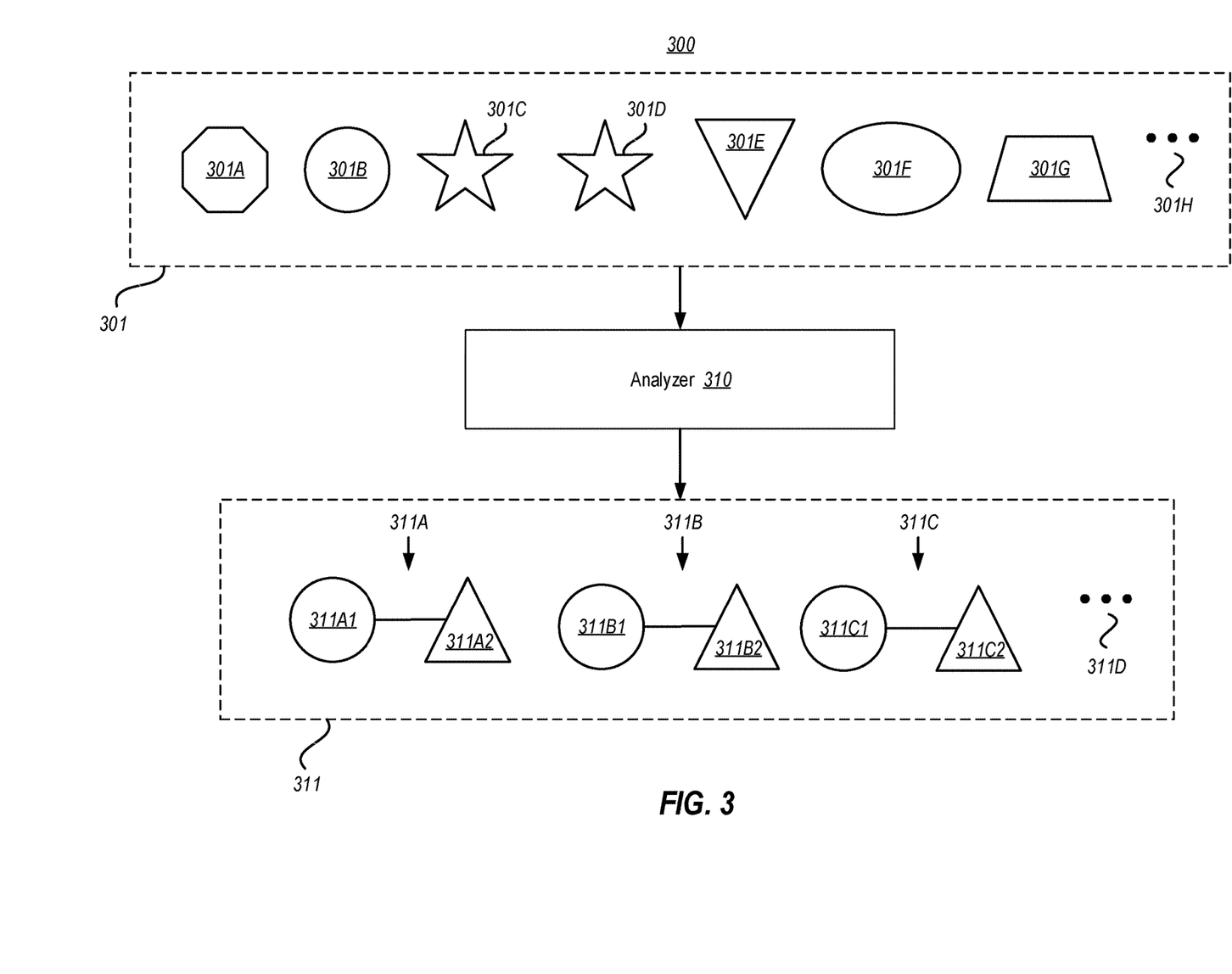
FIG. 3 illustrates an environment in which an analyzer component analyzes a collection of execution records to identify patterns within the execution records, the patterns being associated with corresponding behaviors.
Figure 4:
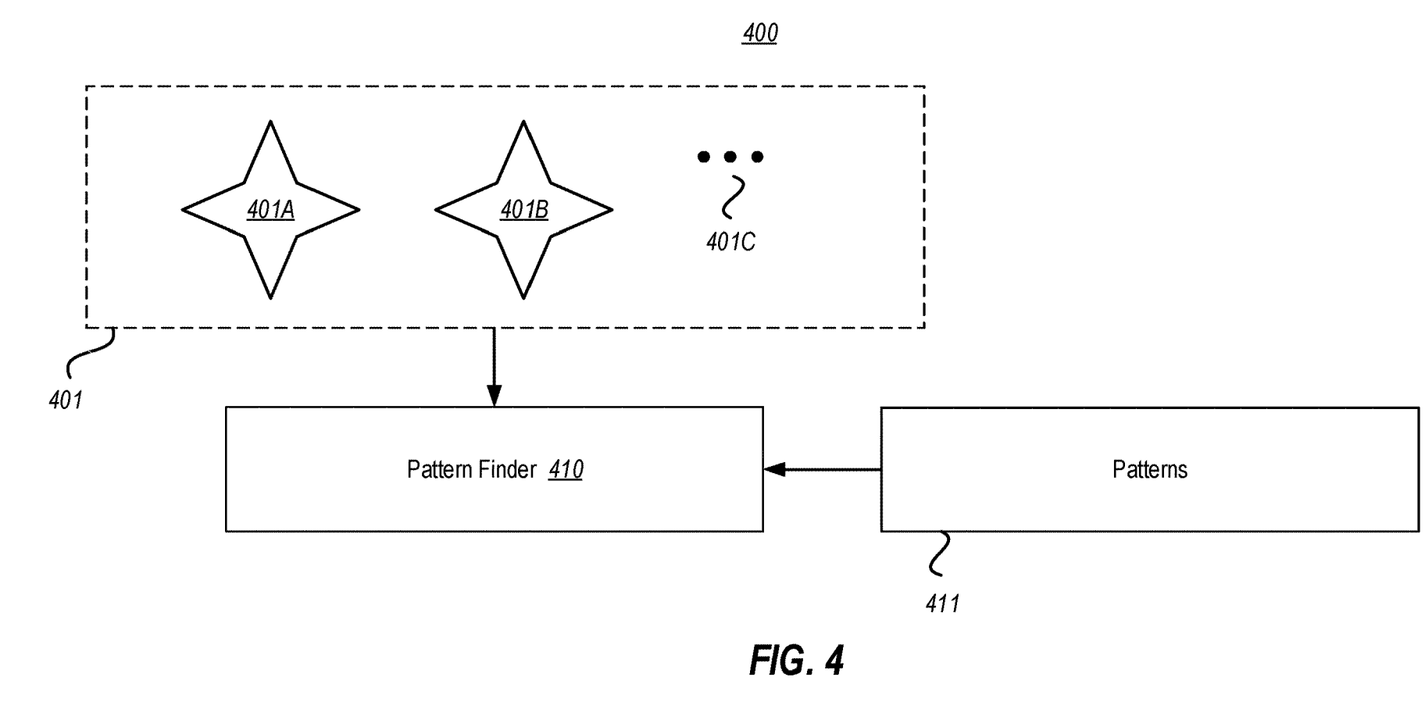
FIG. 4 illustrates an environment in which a pattern matching component matches patterns found within one or more execution records of particular software against known patterns, to thereby detect certain behaviors in that particular software.

FIG. 2 also illustrates a flowchart of a method 200 for automatically identifying an execution behavior of software. The method 200 of FIG. 2 is one example of the corresponding acts that support the step of automatically identifying an execution behavior of software (step 110). FIGS. 3 and 4 illustrate various execution record analysis environments 300 and 400. As the method 200 of FIG. 2 may be performed in an environment in which execution records are analyzed, the method 200 of FIG. 2 will now be described with respect to the execution record analysis environments 300 and 400 of FIGS. 3 and 4, respectively.

The method 200 includes analyzing execution records to identify a particular pattern that represents an execution behavior (act 201). As an example, the execution behavior might represent a problem behavior, or a behavior that might be changed to improve software that happens to contain the particular pattern. Such execution behaviors might relate to the environment in which software is executed. For instance, the execution behavior might include difficulty connecting to or interfacing with certain environmental resources (such as a database), failure to use certain credentials set within the operating environment, encountering an error due to the failure to set one or more environmental variables, an environmental resource becoming dereferenced, edge conditionals being encountered that lead to errors, and a multitude of other possibilities.

FIG. 3 illustrates an environment 300 in which an analyzer component 310 analyzes an execution record collection 301 of execution records 301A through 301G. Thus, act 201 may be performed in the environment 300 of FIG. 3, whereas the remainder of the method 200 may be performed in the environment 400 of FIG. 4. The analyzer component 310 may be structured as described below for the executable component 606 of FIG. 6.

Each execution record includes a representation of how various software was executed. The principles described herein are not limited to the type of execution records. Some execution records might only roughly capture execution state. For instance, an execution log might perhaps only capture major events during execution. On the other hand, some execution records trace the execution with exact precision, such that every instruction that was executed is known, and such that the exact value(s) of data input to that instruction (and output from that instruction) are known from that trace. Such execution traces may so precisely define the execution that the execution may be performed again, exactly how it was earlier, using information from the execution trace. The principles described herein may operate with execution records, whether roughly capturing execution state, precisely capturing execution state, or any level of precision therebetween.

The execution records in the execution record collection 301 are each shown as having various shapes to represent that the execution records represent execution of a variety of different software. But even amongst the execution records of different software, common patterns may emerge that represent interesting execution behaviors. These interesting behaviors may be potentially problematic behaviors. The ellipsis 301H represents that there may be a very large number (thousands, millions, billions, and so forth) of execution records being analyzed by the analyzer component 310 to thereby obtain a very comprehensive and clear historical analysis of software executions.

The result of the analysis is a collection 311 of patterns. In the specific case of FIG. 3, the result is a collection of paired patterns and execution behaviors. For instance, the collection 311 is illustrated as having pairs 311A through 311C. Each pair has a circle representing a pattern found in execution records, and an associated triangle representing the execution behavior that is associated with that pattern. For instance, pair 311A includes execution record pattern 311A1 associated with execution behavior 311A2, pair 311B includes execution record pattern 311B1 associated with execution behavior 311B2, and pair 311C includes execution record pattern 311C1 associated with execution behavior 311C2.

The ellipsis 311D represents that the analyzer component 310 may find any number (and perhaps an innumerable number) of pattern-behavior pairs. The pairs may also be identified with the assistance of observing when users are dissatisfied with particular patterns (e.g., they modify the pattern). That may help to determine which patterns are interesting to pair up with an associated behavior. The generation of pattern-behavior pairs may be an ongoing process performed over extended periods of time, such that the collection 311 has been accumulated over a long period of time. Thus, the act 201 may be performed well in advance of the remainder of the method 200.

The analyzer component may use machine learning techniques in order to identify pairs. For instance, machine learning techniques may be used to automatically identify and present differences between an execution record of a prior version of software, and an execution record representing a subsequent version of the software.

Returning to FIG. 2, the method 200 includes accessing an execution record of an execution of the software (act 211). Here we are dealing with specific software whose execution is under evaluation (hereinafter referred to as "particular software"), for instance, to potentially see how the particular software might be modified. This might be software that is currently being debugged by one or more developers. Alternatively, this particular software might have been already deployed in one or more operating environments. The remainder of method 200 may be performed in the environment 400 of FIG. 4. Accordingly, the remainder of the method 200 will now be described with respect to the environment 400 of FIG. 4.

Referring to FIG. 4, there is an execution record set 401 of one or more execution records of software that is currently under evaluation. As illustrated, the execution record set 401 includes two execution records 401A and 401B. The fact that these execution records of different executions of the same software is represented by each of the two execution records 401A and 401B having the same shape. Note that the shape is different than any of the shapes shown in the execution record collection 301 of FIG. 3. This is to merely show that the execution record(s) for the particular software being evaluated need not have been (but may be) included within the execution record collection 301 that was used by the analyzer component 310 to extract interesting execution record patterns and corresponding execution behaviors.

The ellipsis 401C represents that a pattern finder component 410 may search for pattern(s) within just a single execution record for particular software, or within multiple execution records for that software. Thus, the act of accessing an execution record of an execution of the software (act 211) may be performed as part of a larger act of accessing multiple execution records for that particular software (also represented by act 211). The pattern set that the pattern finder component 410 may look for is represented by the pattern set 411. The pattern set 411 may contain as few as one of the patterns within the collection 311 of pattern-behavior pairs, or may continue multiple patterns from the collection 311. The pattern finder component 410 may be structured as described below for the executable component 606.

The method 200 then includes finding a pattern within the execution record (act 212). For instance, referring to FIGS. 3 and 4, suppose that the pattern finder component 410 finds the pattern 311B1 within the execution record 401A. Again, the act of finding the particular pattern within the execution record (act 212) may be part of an act of finding the particular pattern in at least some of the multiple execution records of the multiple of execution records of the particular software (also represented by act 212) should there be multiple execution records for that particular software. For instance, referring to FIGS. 3 and 4, suppose that the pattern finder component 410 finds the pattern 311B1 within each of at least some of the execution records (e.g., execution records 401A and 401B) in the execution record set 401 for that particular software. The pattern finder component 410 may look for all possible patterns, of the list of possible patterns may be reduced using input from the user, or perhaps machine learning techniques.

Evaluation of multiple execution records may be helpful where the execution of software is being evaluated for multiple post-deployment operating environments. The software will have different executions (and thus difficult execution records) in each operating environment. Thus, in will allow for comprehensive analysis of how the particular software actually executes within a wide variety of execution environments. This will allow for the detection of what problems (of the innumerable possible problems) that are trending into existence within the operating environments. Attention may then be immediate addressed towards correcting those problems, rather than problems that (while theoretically possible) will never actually happen. The end result is more efficient use of resources to improve quality of software as that software operates within various working environments.

The method 200 then identifies that the corresponding execution behavior is present within the software (act 213) based on the act of finding the particular pattern within the execution record (act 212) (or within at least one of the execution records if multiple execution records of the particular software were searched). For instance, referring to FIGS. 3 and 4, if the pattern finder component 410 detects the pattern 311B1 within the execution record(s), then the computing system may identify that the execution behavior 311B2 is present when the software was executed within its respective environments.

As previously mentioned, the execution record(s) might represent an execution of the software being authored. Thus, the analysis of the execution record(s) may help identify execution behaviors and/or associated patterns is execution so that they might be corrected during the debugging phase. However, the analysis of execution record(s) may be particularly helpful for analyzing executions after the software is authored and deployed within its working environment (or within various working environments). Such environment-related problems might be difficult to anticipate at the software authoring phase, as the variety of environment-related problems that could arise is countless and it is difficult to anticipate what actual problems are actually going to arise. For instance, perhaps the environment does not have a database that is configured correctly, or perhaps credentials were set wrong, perhaps environmental variables were not set correctly, and so forth almost infinitum. However, by allowing a mechanism to detect the environmental problems that actually have been encountered, the software provider can address the environmental execution problems that are tending to arise in the environment, allowing the software provider to ultimately provide software that more closely meets the characteristics of the ultimate execution environment. The principles described herein may thus greatly assist in improving the performance of deployed software.

Figure 5:
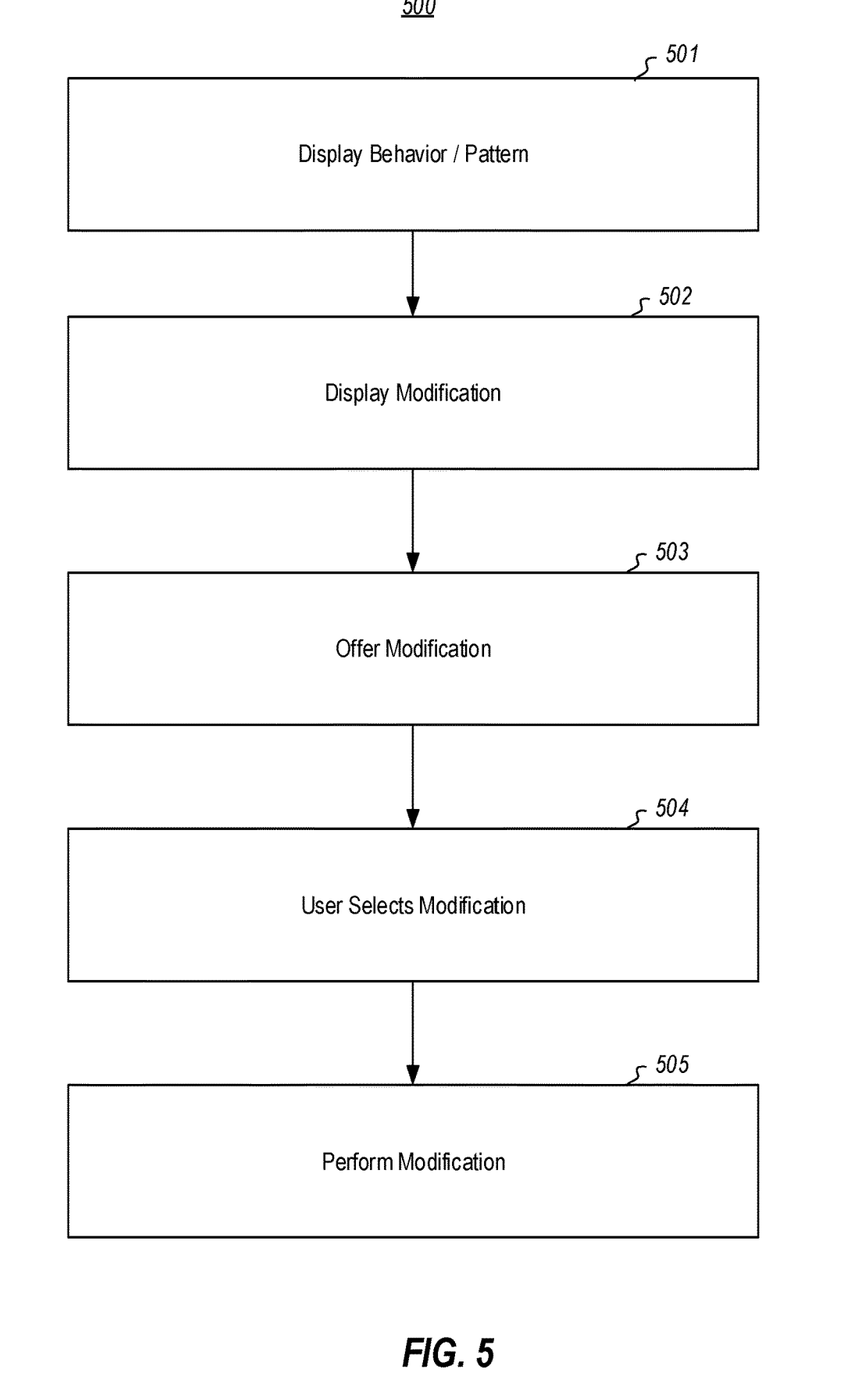
FIG. 5 illustrates a flowchart of a method for modifying the execution behavior of software and includes one example of corresponding acts used to support the second step of FIG. 1.

Referring back to FIG. 1, once the identified execution behavior is automatically identified (step 110), that identification may then be used to modify the execution behavior (step 120). FIG. 5 illustrates a flowchart of a method 500 for modifying the execution behavior and includes one example of corresponding acts used to support the modification of the execution behavior (step 120).

Specifically, the computing system might display an identification of the execution behavior and/or the associated pattern to the user (act 501). The user may then note the execution behavior and/or the associated pattern and take appropriate action themselves to modify the execution behavior or pattern if the user feels that would be appropriate.

Alternatively, or in addition, the computing system might display an identification of a modified execution behavior and/or a modified associated pattern to the user (act 502). The user may then note the modified execution behavior and/or the associated modified pattern and take appropriate action themselves to modify the execution behavior or pattern if the user feels that would be appropriate. The modified execution behavior and/or modified pattern may have been previously identified by, for instance, observing what other users do when they encounter the execution behavior in order to modify that execution behavior.

Alternatively, or in addition, the computing system may offer to perform a modification of the execution behavior and/or the associated modified pattern to the user (act 503). As an example, the execution behavior might be that environmental variables were not set. The suggested modification might be to add a file to the software which automatically sets the environmental variables so that the variables at least do not have a null value. This offering may take the form of a control that may be interface with by the user. In response to receiving an indication that the user has selected the modification (act 504), the computing system may automatically perform the selected modification (act 505). For instance, if the execution behavior was failing to set the values of environmental variables, the computing system itself might automatically add a file that sets the environmental variables. Thus, embodiments described herein may also assist in modifying the execution behavior and/or pattern to thereby improve efficiency in improving the behavior of software.

Because the principles described herein operate in the context of a computing system, a computing system will be described with respect to FIG. 6. Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses, watches, bands, and so forth). In this description and in the claims, the term "computing system" is defined broadly as including any device or system (or combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 6:
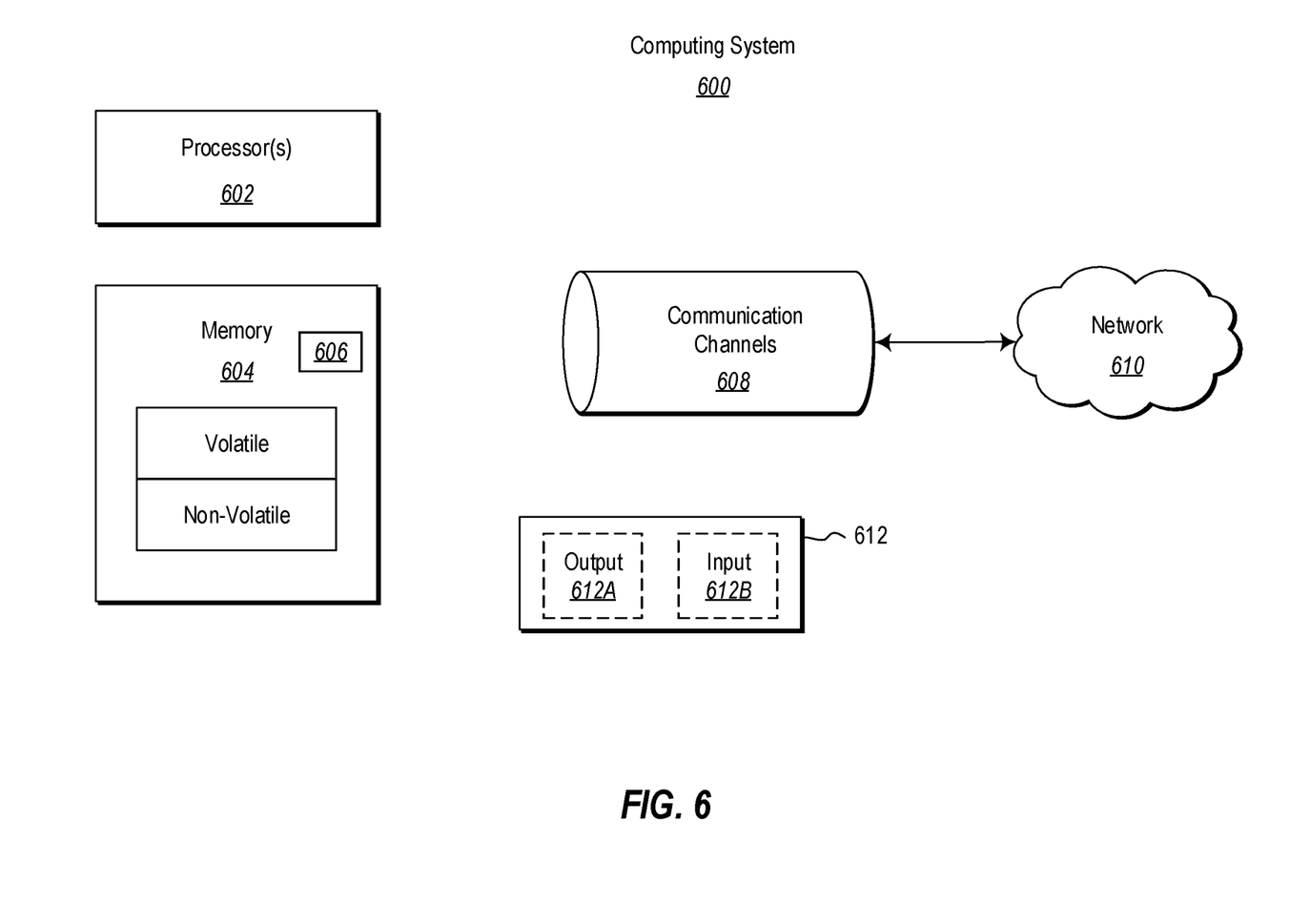
FIG. 6 illustrates an example computer system in which the principle described herein may be employed.

As illustrated in FIG. 6, in its most basic configuration, a computing system 600 typically includes at least one hardware processing unit 602 and memory 604. The memory 604 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well.

The computing system 600 has thereon multiple structures often referred to as an "executable component". For instance, the memory 604 of the computing system 600 is illustrated as including executable component 606. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods that may be executed on the computing system, whether such an executable component exists in the heap of a computing system, or whether the executable component exists on computer-readable storage media.

In such a case, one of ordinary skill in the art will recognize that the structure of the executable component exists on a computer-readable medium such that, when interpreted by one or more processors of a computing system (e.g., by a processor thread), the computing system is caused to perform a function. Such structure may be computer-readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the term "component" or "vertex" may also be used. As used in this description and in the case, this term (regardless of whether the term is modified with one or more modifiers) is also intended to be synonymous with the term "executable component" or be specific types of such an "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data.

The computer-executable instructions (and the manipulated data) may be stored in the memory 604 of the computing system 600. Computing system 600 may also contain communication channels 608 that allow the computing system 600 to communicate with other computing systems over, for example, network 610.

While not all computing systems require a user interface, in some embodiments, the computing system 600 includes a user interface 612 for use in interfacing with a user. The user interface 612 may include output mechanisms 612A as well as input mechanisms 612B. The principles described herein are not limited to the precise output mechanisms 612A or input mechanisms 612B as such will depend on the nature of the device. However, output mechanisms 612A might include, for instance, speakers, displays, tactile output, holograms, virtual reality, and so forth. Examples of input mechanisms 612B might include, for instance, microphones, touchscreens, holograms, virtual reality, cameras, keyboards, mouse or other pointer input, sensors of any type, and so forth.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments can comprise at least two distinctly different kinds of computer-readable media: storage media and transmission media.

Computer-readable storage media include RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or components and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface component (e.g., a "NIC"), and then eventually transferred to computing system RAM and/or to less volatile storage media at a computing system. Thus, it should be understood that readable media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses or watches) and the like. The invention may also be practiced in distributed system environments where local and remote computing systems, which are linked (either by hardwired data links, wireless data links, or by a combination of hardwired and wireless data links) through a network, both perform tasks. In a distributed system environment, program components may be located in both local and remote memory storage devices.

Those skilled in the art will also appreciate that the invention may be practiced in a cloud computing environment, which is supported by one or more datacenters or portions thereof. Cloud computing environments may be distributed, although this is not required. When distributed, cloud computing environments may be distributed internationally within an organization and/or have components possessed across multiple organizations.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand, self-service, broad network access, resource pooling, rapid elasticity, measured service, and so forth. A cloud computing model may also come in the form of various application service models such as, for example, Software as a service ("SaaS"), Platform as a service ("PaaS"), and Infrastructure as a service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable storage media having thereon computer-executable instructions that are structured such that, when executed by the one or more processors, cause the computing system to perform the following:
   analyze a plurality of execution records of a software application in a debugging environment to identify one or more pattern-behavior pairs, each of the one or more pattern-behavior pairs including a code execution pattern and a corresponding execution behavior that is likely to occur when the code execution pattern exists within the software application;
   record a new execution of the software application in the debugging environment as a new execution record, each of the plurality of execution records and the new execution record comprising execution traces that reproducibly represent the execution of the software application;
   analyze the new execution record in the debugging environment by using the new execution record to return the new execution of the software application, in order to find at least one particular code execution pattern that is produced by rerunning the new execution record of the software application;
   identify a particular execution behavior corresponding to the at least one particular code execution pattern based on the one or more pattern-behavior pairs; and
   in response to identifying the particular execution behavior, suggest a modification of the at least one particular code execution pattern within the software application to prevent the particular execution behavior from occurring during execution of the software application.

2. The computing system in accordance with claim 1, each execution record comprising an execution trace that defines the execution of the software application within an environment.

3. The computing system in accordance with claim 1, each execution record comprising an execution log.

4. The computing system in accordance with claim 1, an execution behavior comprising environmental execution behaviors that are specific to some environments in which the software application is executed.

5. The computing system in accordance with claim 4, the plurality of execution records of the software application occurring in a plurality of different execution environments.

6. The computing system in accordance with claim 1, an execution behavior comprising a failure to properly configure an environment resource within the environment in which the software application is executed.

7. The computing system in accordance with claim 1, the identifying that the particular execution behavior is present within the software application being based on finding the at least one particular pattern in at least some of the plurality of execution records of the software application.

8. The computing system in accordance with claim 1, the computing system further caused to perform:
   display an identification of the particular execution behavior or the at least one particular pattern to a user.

9. The computing system in accordance with claim 8, the computing system further caused to perform:
   identify a replacement pattern for the at least one particular pattern that would allow the particular execution behavior to be modified.

10. The computing system in accordance with claim 8, the computing system further caused to perform:
    offer to a user to replace the at least one particular pattern with a modified pattern;
    receive an indication that the user has selected to accept the offer; and
    automatically replace the at least one particular pattern with the modified pattern in response to receiving the indication that the user has selected the modified pattern.

11. The computing system in accordance with claim 1, the computing system further caused to perform:
    offer a modification of the particular execution behavior to a user.

12. The computing system in accordance with claim 11, the computing system further caused to perform:
    receive an indication that the user has selected the modification; and
    automatically perform the selected modification in response to receiving an indication that the user has selected the modification.

13. The computing system in accordance with claim 1, the analyzing a plurality of execution records to identify one or more pattern-behavior pairs also including analyzing previous changes to the at least one particular pattern performed by users in order to modify the particular execution behavior.

14. The computing system in accordance with claim 1, an execution behavior comprising environmental execution behaviors that are specific to some environments in which the software application is executed.

15. The computing system in accordance with claim 1, an execution behavior comprising a failure to properly configure an environment resource within the environment in which the software application executed.

16. A method for automatically identifying an execution behavior of software, the method comprising:
    analyzing a plurality of execution records of a software application in a debugging environment to identify one or more pattern-behavior pairs, each of the one or more pattern-behavior pairs including a code execution pattern and a corresponding execution behavior that is likely to occur when the code execution pattern exists within the software application;

recording a new execution of the software application in the debugging environment as a new execution record, each of the plurality of execution records and the new execution record comprising execution traces that reproducibly represent the execution of the software application;

analyzing the new execution record in the debugging environment by using the new execution record to return the new execution of the software application, in order to find at least one particular code execution pattern that is produced by rerunning the new execution record of the software application;

identifying a particular execution behavior corresponding to the at least one particular code execution pattern based on the one or more pattern-behavior pairs; and in response to identifying the particular execution behavior, suggesting a modification of the at least one particular code execution pattern within the software application to prevent the particular execution behavior from occurring during execution of the software application.

17. The method in accordance with claim 16, each execution record comprising an execution trace that defines the execution of the software within an environment.

18. The method in accordance with claim 16, each execution record comprising an execution log.

19. The method in accordance with claim 16, the plurality of execution records of the software application occurring in a plurality of different execution environments.

20. A computer program product comprising one or more computer-readable storage media having thereon computer-executable instructions that are structured such that, when executed by one or more processors of a computing system, cause the computing system to perform the following:

analyze a plurality of execution records of a software application in a debugging environment to identify one or more pattern-behavior pairs, each of the one or more pattern-behavior pairs including a code execution pattern and a corresponding execution behavior that is likely to occur when the code execution pattern exists within the software application;

record a new execution of the software application in the debugging environment as a new execution record, each of the plurality of execution records and the new execution record comprising execution traces that reproducibly represent the execution of the software application;

analyze the new execution record in the debugging environment by using the new execution record to return the new execution of the software application, in order to find at least one particular code execution pattern that is produced by rerunning the new execution record;

identify a particular execution behavior corresponding to the at least one particular code execution pattern based on the one or more pattern-behavior pairs; and in response to identifying the execution behavior, suggest a modification of the at least one particular code execution pattern within the software application to prevent the particular execution behavior from occurring during execution of the software application.

* * * * *